UNITED STATES PATENT OFFICE.

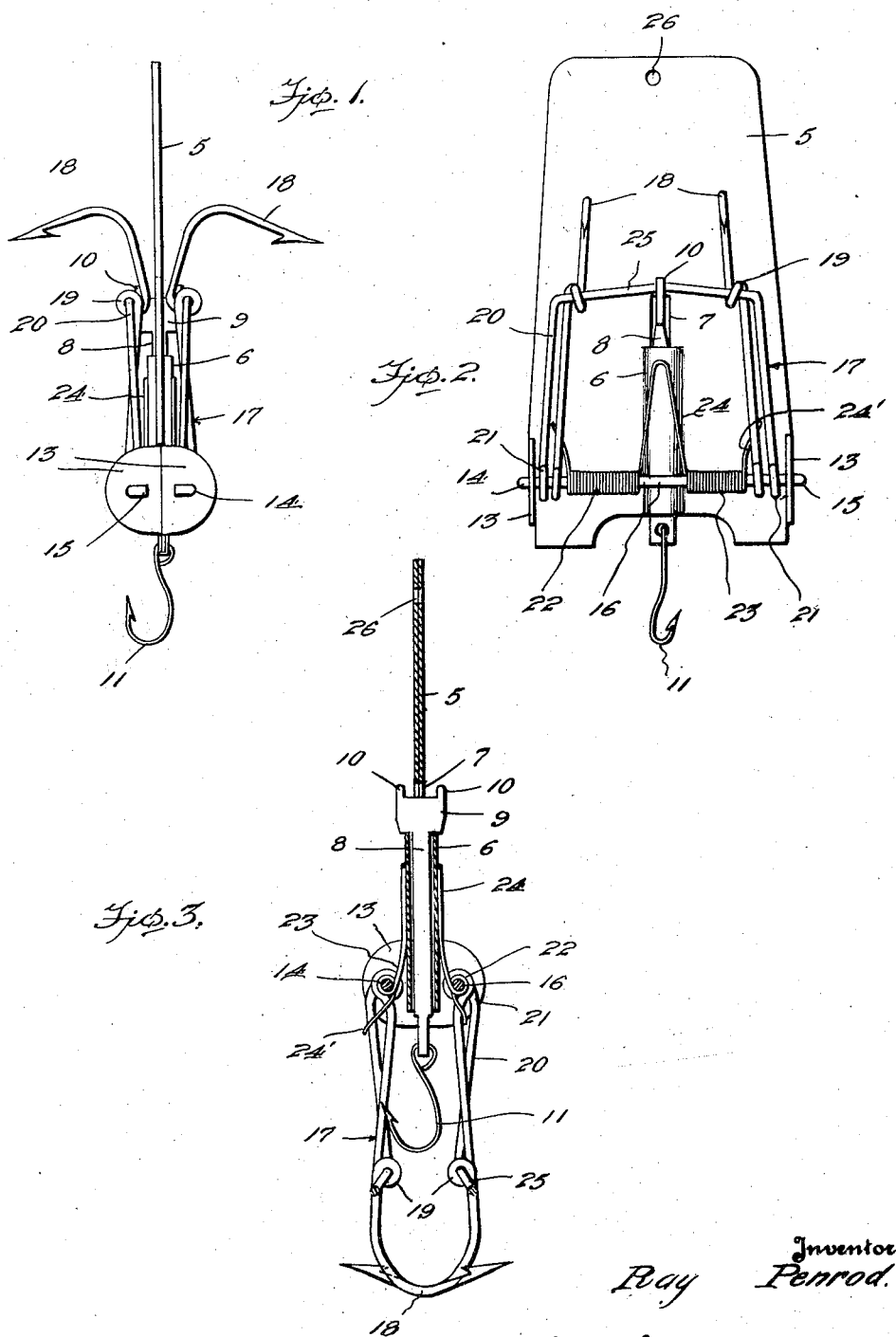

RAY PENROD, OF CYPRESS, ILLINOIS.

FISH-HOOK.

1,242,469.  Specification of Letters Patent.  Patented Oct. 9, 1917.

Application filed October 4, 1916. Serial No. 123,729.

*To all whom it may concern:*

Be it known that I, RAY PENROD, a citizen of the United States, residing at Cypress, in the county of Johnson and State of Illinois, have invented certain useful Improvements in Fish-Hooks, of which the following is a specification, reference being had therein to the accompanying drawing.

This invention relates to improvements in fish hooks, one object of the invention being the provision of that type of hook in which the grapple or snare members are adapted to be held extended against spring tension and to be released by a trigger to which the bait is attached, thus providing a means for automatically gripping the fish and holding the same captive.

A further object of this invention is the provision of a device of this character which is simple, durable and inexpensive in construction, and thoroughly efficient and practical in use.

In the accompanying drawings:—

Figure 1 is a side elevation of the complete trap set.

Fig. 2 is a plan view thereof.

Fig. 3 is a longitudinal sectional view of the trap with the ensnaring hooks in gripping position.

Referring to the drawings, the numeral 5 designates the carrying plate of the present device, which is preferably made of two sheets of metal so as to provide the sleeve 6 with the elongated slot 7 at the lower end thereof and for the reception of the rod 8 which carries the head 9 having the two catches 10. A bait hook 11 is mounted in the free end of the rod.

Each plate is provided with a pair of apertured lugs 13 for the reception of the U-shaped member 14 which is held against movement by means of the riveted or bent ends 15 thereof.

Mounted for swinging movement upon each member 16 of the U-shaped member between the respective lugs is a grappling member 17 which consists of the two hooks 18, each having the intermediate eye 19 for the reception of the U-shaped bail 20 whose terminal eyes 21 are mounted for swinging movement upon its respective member 16. In this manner, the two grappling members are held in proper spaced relation and so as to coöperate when sprung from the position shown in Fig. 1 to that shown in Fig. 3.

Wound upon each member 16 are the two coils 22 of the spring 23, the loop terminal 24 of which rests upon the outer face of the trigger carrying tube, while the hook terminals 24 engage the respective hooks of each grappling member and exert a tension to move the grappling members toward each other. The connecting member 25 of the U-shaped connecting member is adapted to be engaged by the catch end of the trigger at opposite sides of the plate 5, so that the grappling members are held in the position as shown in Fig. 1 to be released when the trigger is pulled upon by the fish. The aperture 26 is provided in the plate 5 so that the present device may be connected or suspended in any desired manner. It is to be understood that the style of the hook can be varied and also that additional hooks may be employed should the occasion require.

What I claim as new is:—

In a device of the kind described, in combination, a carrying plate having a lateral sleeve, a pair of right angularly disposed lugs on said plate, a pivot rod mounted in said lugs, a U-shaped member having eyes formed upon its opposite arms, said eyes embracing said pivot rod, the cross rod of said U-shaped member inclining in opposite directions from the center toward the opposite arms thereof, a pair of arms formed with terminal eyes embracing said pivot rod and with intermediate eyes embracing said oppositely inclined sides of said member, hooks formed upon the free ends of said arms, a spring clamp consisting of two coils surrounding said pivot rod, an intermediate loop bearing against said sleeve and fingers pressing against said last-named arms to urge them forwardly, a rod slidably mounted in said sleeve and having a top recess, a bait hook secured to the lower end of said rod, the cross rod of said member adapted to normally have its medial portion disposed in said recess.

In testimony whereof I affix my signature.

RAY PENROD.

Copies of this patent may be obtained for five cents each, by addressing the "Commissioner of Patents, Washington, D. C."